UNITED STATES PATENT OFFICE.

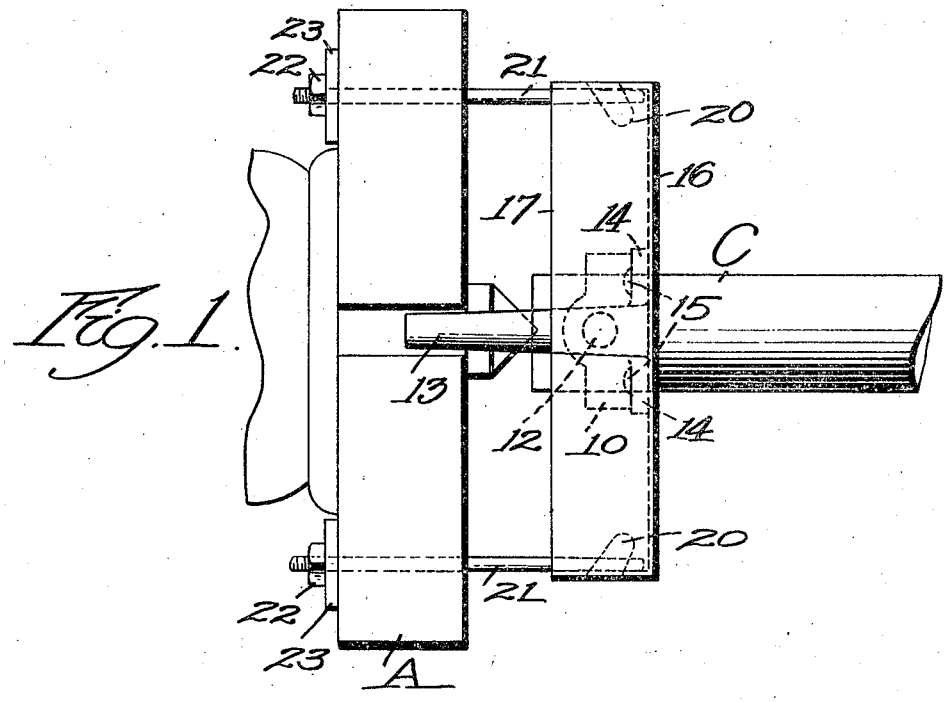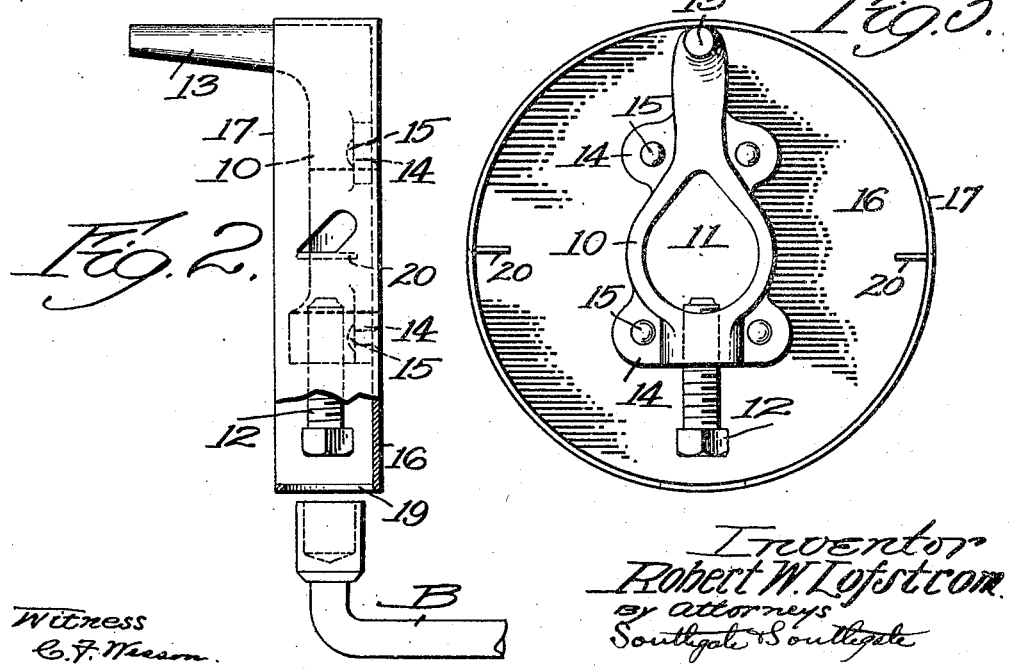

ROBERT W. LOFSTROM, OF WORCESTER, MASSACHUSETTS.

LATHE-DOG.

1,342,122.  Specification of Letters Patent.  Patented June 1, 1920.

Application filed September 10, 1919. Serial No. 322,805.

*To all whom it may concern:*

Be it known that I, ROBERT W. LOFSTROM, a citizen of the United States, residing at Worcester, in the county of Worcester and State of Massachusetts, have invented a new and useful Lathe-Dog, of which the following is a specification.

This invention relates to a lathe dog and preferably one formed substantially in the ordinary well-known manner.

The principal objects of the invention are to provide a simple and inexpensive guard which will prevent all parts of the dog coming into contact with the workmen's fingers under practical conditions to which it may be subjected and so built as to include the dog and eliminate projecting parts as well as perforations and passages into which the hand or a tool might be accidentally introduced; also to provide in combination therewith, means for attaching the dog to the face plate when it is desired to draw back the tail stock for any purpose so that the work will remain accurately centered. This latter object is accomplished by means of hooks coöperating with certain features of the guard plate which can be provided very easily and inexpensively in connection with the construction above described. Further objects and advantages of the invention will appear hereinafter.

Reference is to be had to the accompanying drawings, in which—

Figure 1 is a plan view of a preferred form of this invention shown as applied to a piece of work centered on a lathe;

Fig. 2 is a side view of the dog with a part broken away to show the interior construction and illustrating the manner of tightening up the dog on the work; and Fig. 3 is a rear elevation.

The invention is shown as embodying a dog 10 substantially of the usual well-known shape and construction. It is provided with a main portion having a passage 11 therethrough for the work, a screw 12 for tightening it up against the work C, and a tail 13 for engagement with the face plate or the like. These parts, as stated, can be of the ordinary shape and material without alteration, but I have provided this dog with four flanges 14, in the form shown, by which it is attached by means of rivets 15, to a guard plate 16.

The guard plate is made preferably of thin sheet metal and provided with an integral flange 17 formed in dies as will be readily understood. It is applied to the face of the dog farthest from the face plate A. The plate 16 preferably is perfectly flat on its outer surface and it extends inwardly at the center to the boundary of the passage 11 and has a passage through it registering with, and of the same size and shape as that passage. These two being riveted together, are thereafter substantially a single piece, and of course, are never separated in practice. It will be observed that the tail 13 is protected at one end by this flange 17 which extends around that part of the tail and beyond it.

The parts so far described constitute a single unitary construction with no movable parts except the usual screw 12 and the plate constitutes a rotating element with smooth outer surfaces mounted substantially concentrically on the work so that it affords neither projections nor passages by which the workman can be injured. All parts of the dog and this screw are protected and very little expense added. In the form shown, the screw is operated by the usual wrench B through an opening 19 in the flange 17.

For the purpose of keeping the work C centered when the tail stock is to be moved back for any purpose, I have provided the flange 17 with two small perforations made by punching inwardly two tongues 20, the shape of which will be obvious from Fig. 1. They furnish lugs behind which hooks 21 can be attached for holding the whole device up in central position. Two of these hooks are shown extending through the face plate A and adjusted in position by a nut 22 and plate 23. In this way, the work can be held in central position, even when not supported at the opposite center, that end of the work being upheld by the center-rest and the attachment for this purpose is provided in a most simple and inexpensive manner in connection with the guard.

It is to be noted that this guard protects all parts of the dog including the screw 12, leaving no chance for it to catch hold of anything when in rotation. It is very easy to fasten in place, not being any more complicated in this respect than the ordinary dog and is also easy to fasten to the face plate, by means of the hooks 21. In fact, if these hooks should be lost, it can be fastened by two wires or other ordinary devices that are usually found in a machine shop. The screw can be turned up by a socket, fork or S wrench. The manner of attaching the guard to the dog is such that the attachment will be extremely strong even if the guard is made of relatively light sheet metal, because the holes in the flanges and in the sheet metal are both counter-sunk and this counter-sinking on the dog can be made quite deep, so parts of the stock around the holes of the guard will sink into the counter-sinking of the dog. Thus the parts will not work loose or fall apart under any ordinary usage.

It will be understood of course, that instead of riveting, the two parts can be put together by brazing or welding or the whole device can be cast in one piece if the guard is made heavier. It is an important advantage to have the whole device consist of a single piece, and also it is an advantage that the device takes up practically no space in addition to that taken up by the ordinary rotating dog.

Although I have illustrated only a single form of the invention, I am aware of the fact that many modifications can be made therein and that it can be made in other forms and of other materials than those shown and described. Therefore I do not wish to be limited in these respects, but what I do claim is:—

1. As an article of manufacture, a lathe dog having a passage for the work, an integral tail, and flat external flanges on both sides of said passage in a plane, and provided with a sheet metal guard plate riveted to said dog through said flanges, said plate being provided with a flat outer surface on one side of the dog, and having a passage therethrough registering with said passage in the dog, but otherwise imperforate, and having an integral cylindrical flange inclosing said dog and extending beyond it and located outside the tail to protect it.

2. The combination with a lathe dog made complete in itself, of a sheet metal guard plate secured to said dog and constituting a single piece with it and having a flat outer wall beyond the dog, provided with a passage through it registering with the work receiving passage in the dog and having an integral circumferential flange wider than the dog, said flange inclosing the dog and the tail and provided with integral lugs projecting inwardly and protected by the flange, and means for engaging said lugs and holding the protecting plate to the face plate of the lathe in a central position.

3. The combination of a lathe dog having a passage for the work and a tail, a guard plate fixedly connected to said dog, said plate comprising a flat outer surface on one side of the dog, and having a passage therethrough registering with said passage in the dog and having a cylindrical flange inclosing said dog and extending beyond it and located outside the tail to protect it, said flange having inwardly extending lugs, and hooks for engaging said lugs and the lathe face plate and holding the dog and guard plate fixed in position to keep the work centered when held only by the head stock, and the center rest.

4. The combination with a guard plate for a lathe dog having integral lugs inside the same, of means for engaging said lugs and holding the guard plate to the face plate.

5. The combination with a guard plate for a lathe dog, of a pair of hooks adapted to be supported by a face plate and means on the guard plate and protected thereby for engaging said hooks.

In testimony whereof I have hereunto affixed my signature.

ROBERT W. LOFSTROM